Aug. 17, 1954

E. CHRISTENSEN

AUTOMATIC TELECOMMUNICATION SYSTEM WITH ABSENT SUBSCRIBER SERVICE 2,686,842

Filed April 13, 1951

3 Sheets-Sheet 1

Inventor
E. CHRISTENSEN
By Robert Harding Jr.
Attorney

Aug. 17, 1954

E. CHRISTENSEN

AUTOMATIC TELECOMMUNICATION SYSTEM
WITH ABSENT SUBSCRIBER SERVICE 2,686,842

Filed April 13, 1951

3 Sheets-Sheet 2

Inventor
E. CHRISTENSEN
By Robert Harding Jr.
Attorney

Aug. 17, 1954

E. CHRISTENSEN

AUTOMATIC TELECOMMUNICATION SYSTEM
WITH ABSENT SUBSCRIBER SERVICE 2,686,842

Filed April 13, 1951

3 Sheets-Sheet 3

Inventor
E. CHRISTENSEN

By Robert Harding Jr.
Attorney

Patented Aug. 17, 1954

2,686,842

UNITED STATES PATENT OFFICE 2,686,842

AUTOMATIC TELECOMMUNICATION SYSTEM WITH ABSENT SUBSCRIBER SERVICE

Einar Christensen, Copenhagen, Denmark, assignor to International Standard Electric Corporation, New York, N. Y., a corporation of Delaware Application April 13, 1951, Serial No. 220,813

Claims priority, application Denmark April 14, 1950

5 Claims. (Cl. 179—27)

Figure 1:
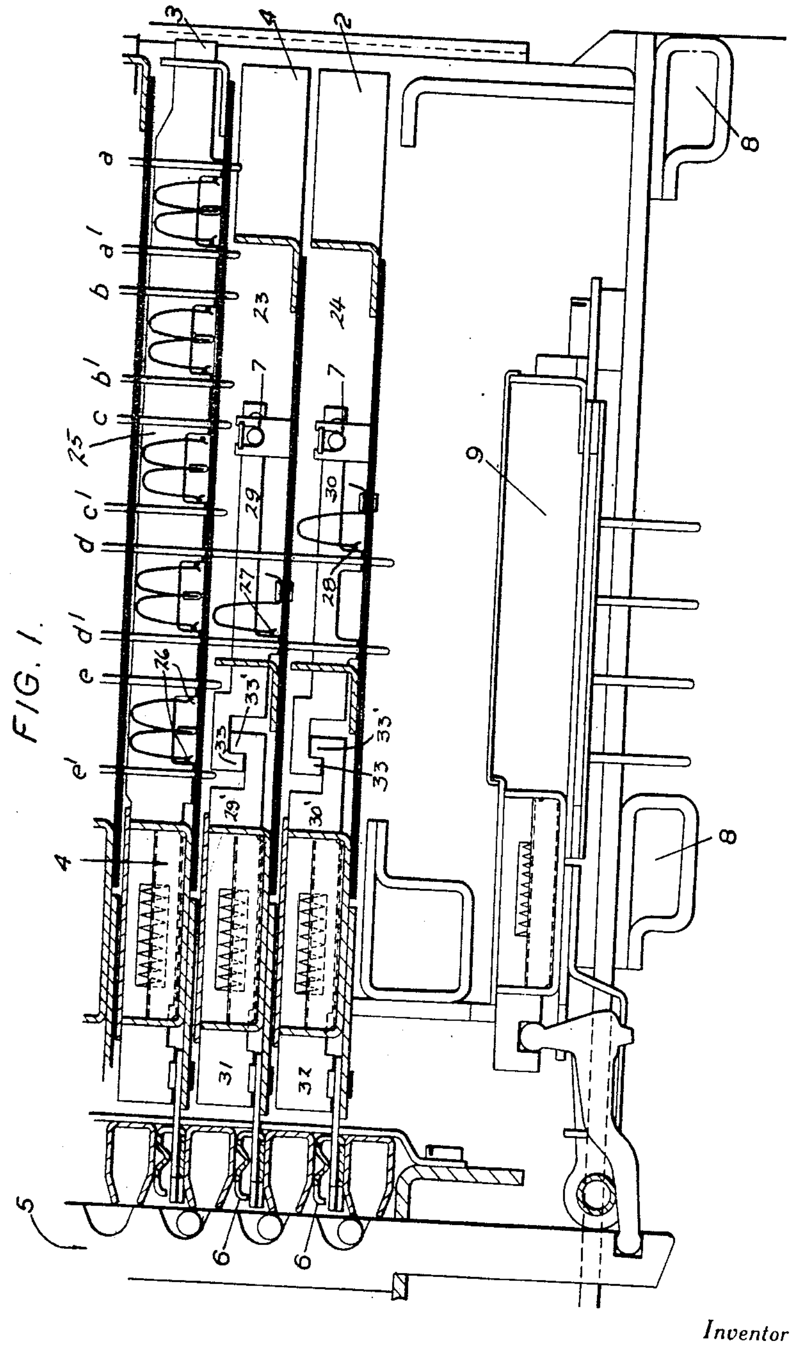

This invention relates to automatic telecommunication systems with absent subscriber service and more particularly refers to telecommunication systems using coordinate selectors with one or more separate sets of contacts per subscriber's line for the establishment of connections therewith.

Different types of coordinate selectors are known, and although the invention will be described in detail in conjunction with one particular type, the invention is not limited thereto, but its principles allow of ready application to other well known types of coordinate switches.

The coordinate switch used as a basis for the description of one possible embodiment of the invention is characterized by the employment of horizontal and vertical bars and by the provision of latch strips corresponding one to each intersection of these bars, which latch strips command the closure or opening of sets of contacts associated with each individual latch strip.

By the operation of a vertical bar a mechanical coupling is established between any of the horizontal bars and the latch strip located at the intersections of each horizontal bar and the operated vertical bar.

One of the horizontal bars is next selected for operation and may be moved in either of two directions, thereby transmitting this motion to the latch strip which is coupled to it, in one of two corresponding directions of motion, the arrangement of contacts controlled by the latch strip being such that for each direction of motion of the latch strip a different set of contacts is closed.

The contacts referred to are closed between a number of sets of vertical bare wires, constituting the so-called multiple of the switch, and flexible horizontal conductors constituting the so-called inlets or feeders. The coordinate switch described may be considered to consist of a number of individual switches, each of these corresponding to one set of inlets, which provide access to all sets of outlets connected to the vertical multiple wires.

Individual to each multi-switch a small amount of mainly electronic apparatus is provided to control the operation of the multi-switch. This equipment is known as the E. S. B. O. equipment, which stands for "electronic selection and bar operating" circuit.

By the connection to one of the conductors, associated with a subscriber's line, of a special electrical condition, this line may be brought into such a condition, that if it is tested for a terminating call, this call is not completed to the line, but is routed to an operator. This arrangement is used to provide what is known as "absent subscriber's service."

The possibility is provided for bringing any subscriber's line at any moment into the so-called "absent subscriber's" condition, or removing this condition at any time from a line on which it is provided, by means of remote control from a centralized absent subscriber's service desk.

This service may be provided without any restriction to any number of subscribers simultaneously.

For this purpose every multi-switch accommodating each group of subscribers contains two extra individual switches, each of which, with respect to absent subscriber's service, may serve 50 subscribers. These two individual switches are of a slightly different design from the ordinary switches.

Figure 6:
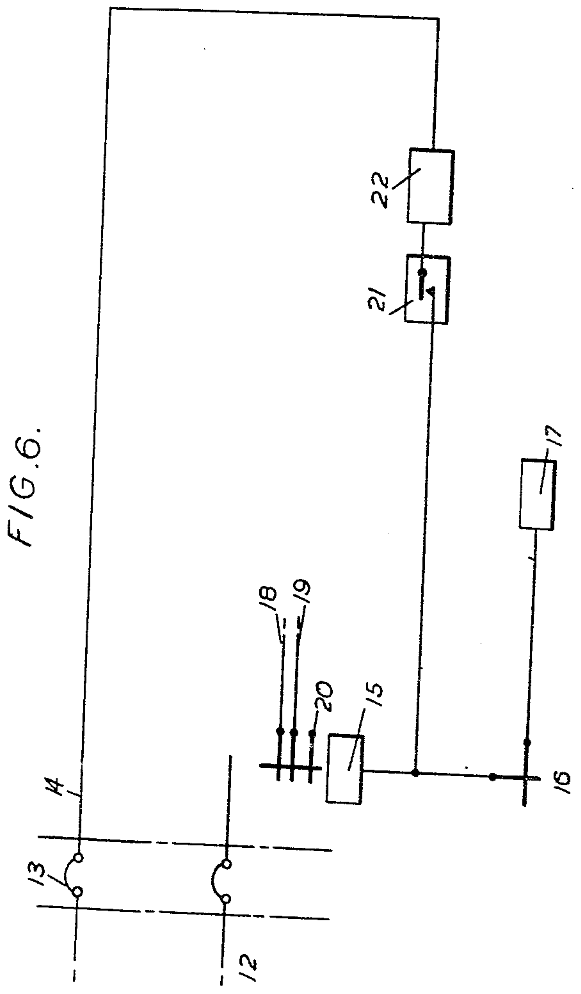

The invention will appear more readily from the below detailed description of an embodiment in connection with the drawing, on which Fig. 1 shows a cross-section of the part of a multi-switch with two extra switches for absent subscriber's service necessary for the understanding of the invention, Figs. 2–5 the extra switch in different positions during operation, and Fig. 6 part of a typical junction diagram of an exchange, in which the principles according to the embodiment of the invention as described have been employed.

Referring to Figure 1 which shows a cross-section of one of the multiple banks associated with a multi-selector, it will be seen that the two extra individual absent subscriber's service switches 23 and 24 are located in the multi-switch immediately below the regular line finders and final selectors, of which the nethermost 25 has been represented on the drawing.

The drawing further shows the two sets of each five multiple wires *a–e* and *a'–e'* which, by means of the movement to the right or the left of the insulating latch strip are connected to the inlet wires 26 of the individual switch. The bare wire multiple terminates at the nethermost regular switch, except for the "*d*" conductors, which are extended further down through the two absent subscriber's service switches 23 and 24, so that they may be employed in connection with said two extra switches.

It will be seen from Fig. 1 that the "*d'*" conductor corresponding to one set of five wires, or a subscriber's line, may be acted upon by the contact 27 forming part of the first extra switch 23, whereas the "*d*" conductor of the other set of five wires, or a subscriber's line, may be acted upon by the contact 28 forming part of the second extra switch 24.

The contacts 27 and 28 in both extra switches are so disposed that they close by a movement of the contact pushing members 29 and 30 in the same direction for the two switches, contrarily to what happens in the regular switches, in which one set of five conductors $a$–$e$ is contacted by a movement of the contact pushing member, viz. the latch strip 3, in one direction, whereas the other set of conductors $a'$–$e'$ is contacted by a movement of the same latch strip 3 in the opposite direction.

The insulating latch strips 29 and 30 of the two extra switches are not made in one piece, as in the regular selectors, but in two separate pieces.

The lefthand parts 29′ and 30′, respectively, of the latch strips 29 and 30 operate exactly in the same manner as a latch strip 3 of a regular switch 25, i. e. they may be moved either inward or outward, leftward or rightward on the drawings, under the action of the horizontal bars 31 and 32, respectively of the switch, when these bars are coupled to the latch strip by the operation of the vertical bar 5.

The righthand part of each latch strip is coupled loosely with the lefthand part by means of interlocking members 33 and 33′, and this part may be moved into one of two positions, viz. a non-operated and an operated position, in each of which it may be held by a locking spring and ball 7 independent of the lefthand part.

The operation of the two parts of the latch strip 29 is illustrated on the drawing, Figs. 2–5, which show the four different conditions of operation, the operation of the latch strip 30 being the same.

Figures 2, 3, 4, 5:
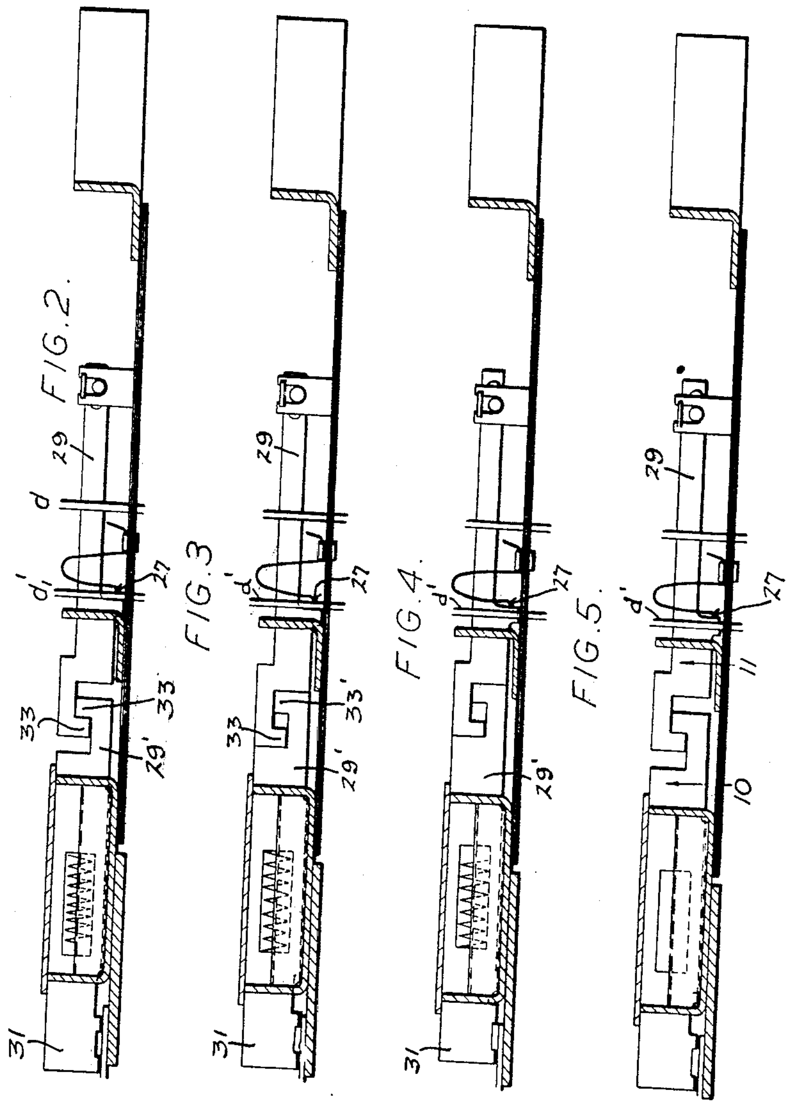

Fig. 5 shows the normal position of the two parts of the latch strip, so that the contact 27 is separated from the vertical wire $d'$.

Fig. 2 shows the lefthand part 29′ of the latch strip 29 moved to the left under the action of the horizontal and vertical bars 31 and 5 of the switch, for the purpose of placing the line in the absent subscriber's condition. The coupling 33, 33′ between the two parts of the latch strip is so arranged, that the righthand part 29 of the latch strip 23 also moves to the left, so that the contact 27 touches the wire $d'$. As soon as this operation has been completed, both vertical and horizontal bars are immediately restored to their normal condition, which also moves the lefthand part 29′ of the latch strip 23 into its normal position. The righthand part 29, however, remains in the operated condition, because the coupling between the two parts is so constructed that by the return of the lefthand part of the latch strip to normal no motion is transferred to the righthand part. This condition is represented in Fig. 3.

It will be seen that in this condition the contact of one individual line remains closed, independent of the horizontal and vertical bars, so that these may be employed for putting other lines of the same switch into absent subscriber service.

When the absentee condition has to be removed, the line is again selected by operating the same vertical and horizontal bars, but this time the horizontal bar is moved in the other direction by the operation of the other servo magnet. Consequently, the latch strip is now moved in the righthand direction, and this movement will be transferred to the righthand part of the latch strip, which is thereby restored to its normal position. This situation has been represented in Fig. 4.

Immediately after this operation has been completed both vertical and horizontal bars again return to normal, which in turn causes the lefthand part of the latch strip to move to its normal position. This leftward movement will not be transferred, and this situation is shown in Fig. 5.

As regards the general method of operation of the system, this may be explained with reference to the junction diagram, Fig. 6, which shows the two absentee switches equipped in each multi-switch serving 100 subscribers' lines.

Each of the two junctions provided for absentee service from the centralized absent subscriber's service desk, contains selecting equipment by means of which one of the 100 E. S. B. O. circuits may be connected under the control of the 1000's and 100's figures of the subscriber's number. This connecting equipment is represented by a contact shown on the junction diagram between the junction circuits and the E. S. B. O. circuits.

When the operator wishes to bring a subscriber's line in the absentee condition, she seizes one of the junctions to the exchange concerned and dials the four last figures of the subscriber's number, which are stored at the junction circuit. The selecting equipment immediately causes the connection of the E. S. B. O. circuit in the required 100's group, but this E. S. B. O. circuit is not busied, so that it remains available for normal originating and terminating traffic. By means of the electronic equipment of the E. S. B. O. circuit the condition of the called line is now determined, viz. busy, free or absentee condition and this condition is signalled to the operator. The operator now may depress one of two keys viz.: "connect absentee condition key" or "disconnect absentee condition key." Alternatively, one key may be employed which is caused to produce two different signals, according to the condition in which the subscriber's line was found.

Upon this, the E. S. B. O. circuit is engaged and the horizontal and vertical bars corresponding to the wanted line are operated. Depending on whether the subscriber's line is connected in the first or second group of 50 lines, the individual "horizontal" magnet of one of the two absentee switches is operated, which magnets for this purpose are equally connected via the connecting equipment to the absentee junction. Finally, depending on whether the first or the second of the two keys mentioned was depressed, or alternatively, depending on the signal received from one key, one or the other of the servo magnets is energized so that the contact $d$ of the selected subscriber will be either closed or opened by means of the latch strip as described in conjunction with Figs. 2–5. Immediately thereafter, all magnets of the multi-switch which were involved in this operation are de-energized, and the E. S. B. O. circuit is released. A second electronic check of the condition of the line is now made and this is signalled to the operator, after which the connection with the E. S. B. O. circuit is severed.

It will be clear from the above, that the same two switches provided for each 100 lines may be employed consecutively in connection with any of the lines connected to them, without affecting the condition of other lines, and also that for either the connection or disconnection of the absentee condition of a particular line, the time during which the E. S. B. O. circuit is engaged is of the same duration as for the establishment of a normal connection. It will be understood that in the individual switches used for absentee service, the latch strips each control the closure or opening of only a single contact cooperating with the particular conductor of the subscriber's line equipment to which the connection of a special electrical condition causes the line to be brought into the absentee condition.

One aspect of the invention resides in the fact that these latch strips are so constructed that at least a part of them may be placed in two positions, viz. one in which the contact is open, and one in which the contact is held closed, and that this part may be locked in either position independent of the operated condition of any of the magnets of the switch.

Another aspect of the invention resides in the fact that the operation of a combination of vertical and horizontal bars may be used to act on a latch strip in such a way that this may be placed in either of the locking positions.

Another aspect of the invention lies in the fact that the two directions into which one of the bars, e. g. the horizontal bar, may be moved when operated, are used in such a manner that by the operative movement in one direction the latch strip is made to close the contact, and by the operative movement in the opposite direction the latch strip is so moved as to open the contact.

As an alternative arrangement the invention may be employed in connection with cross bar switches which are characterized by the fact that the contact closing members used for regular conversational switches only act on a single set of contacts, so that they only move in one direction for closing a set of contacts.

When employed with this type of cross bar switches, the special contacts added on the switch in connection with absentee service, may be provided with a mechanism, well known in itself, by which consecutive motions of an intermediate member in the same direction alternately may cause the closure and opening of the contact. Such a member may, for instance, take the shape of a ratchet wheel, which so acts on the contact that this is closed and opened in alternate positions of the wheel. By the combined action of the vertical and horizontal bars selecting a particular contact, a pawl may be caused to operate, which acts on the ratchet wheel to advance this by one position. When both horizontal and vertical bars are restored, the pawl is also returned to its normal condition, but the rachet wheel remains in the position last occupied.

In this manner, by selecting a contact, the identical operations of a combination of horizontal and vertical bars may alternately cause the closure and opening of the contact.

I claim:

1. An automatic telecommunication system having a plurality of subscriber line circuits, means for selecting one of said line circuits, an operator's position, each line circuit having a control conductor associated therewith, said selecting means comprising a coordinate switch having sets of vertical conductors arranged in parallel rows, there being one set for each line circuit which set includes said control conductor, a plurality of sets of horizontal conductors, each horizontal conductor crossing corresponding ones of said vertical conductors, and means for causing a selected set of said horizontal conductors to connect to a selected set of said vertical conductors, an additional horizontal conductor crossing the control conductors of said vertical sets, means controllable from a remote point for selectably causing the additional horizontal conductor to connect with the control conductor of a selected vertical set, and means for routing calls directed to said line to said operator's position when said additional horizontal conductor is connected to said control conductor of said selected vertical set and a predetermined electrical characteristic appears on said additional horizontal conductor.

2. An automatic telecommunication system, as defined in claim 1, in which there is one set of horizontal conductors in a horizontal row and two sets of vertical conductors in a vertical row, and the means for causing a selected set of said horizontal conductors to connect to a selected set of vertical conductors comprises a plurality of horizontal bars substantially at right angles to said horizontal conductors and arranged in horizontal rows, there being one row for each horizontal row of conductors, means for selectively moving said bars in either longitudinal direction, and means for causing the set of horizontal conductors adjacent a bar to connect to one set of crossing vertical conductors when said bar is moved in one direction and to connect to the other set of vertical conductors when said bar is moved in the other direction, and in which there are two additional horizontal conductors, one adjacent one vertical control conductor and one adjacent the other and the means for causing the additional conductors to connect to the control conductors comprises two additional rows of horizontal bars and means for selectively moving the bars longitudinally in either direction, a latch member loosely coupled to each bar and adapted to have first and second positions of movement, means for retaining the latch members in each position, means connected to the latch members in one horizontal row for causing one additional horizontal conductor to connect to the control conductor of one set in a row of vertical conductors when the associated latch member in one row is in the first position of movement and to disconnect from said control conductor when said latch member is in the second position of movement, means connected to the latch members in the other horizontal row for causing the other additional horizontal conductor to connect to the other control conductor of the other set in a row of vertical conductors when the associated latch member in the other row is in the first position of movement and to disconnect from said control conductor when said latch member is in the second position of movement, the loose coupling between each additional horizontal bar and its associated latch member being such that said bar may return to its normal midway position without moving said latch member out of either its first or second position.

3. An automatic telecommunication system, as defined in claim 2, in which the means for selectively moving the horizontal bars comprises a plurality of vertical bars, one for each vertical row of vertical conductors, a plurality of horizontal members, one for each row of horizontal bars including the additional rows of horizontal bars, arranged adjacent said vertical bars and substantially at right angles to said horizontal bars, means for selectively moving said vertical bars, means for selectively moving said horizontal members, and coupling means for causing a horizontal bar to be moved when its corresponding vertical bar and a horizontal member in its row are moved.

4. A coordinate switch comprising a plurality of parallel horizontal rows of horizontal conductors, the conductors of each row representing one set of inlet conductors, a plurality of parallel vertical rows of vertical conductors, the conductors in each vertical row representing first and second sets of outlet conductors and each vertical conductor crossing the corresponding horizontal conductor in all the horizontal rows, a plurality of horizontal bars mounted for limited longitudinal movement and arranged in horizontal rows and substantially at right angles to said horizontal conductors, there being one bar in each row for each row of vertical conductors and one row of bars for each row of horizontal conductors, means connected to each bar to move the horizontal conductors of the associated row of conductors into contact with respective conductors of the first set of associated vertical conductors when said bar is moved to the limit of its movement in one direction and into contact with respective conductors of the second set of associated vertical conductors when said bar is moved to the limit of its movement in the other direction, first and second additional rows of horizontal bars parallel to said first-mentioned bars and arranged for similar limited longitudinal movement, first and second additional horizontal conductors parallel to the other horizontal conductors and aligned respectively with said first and second rows of horizontal bars, means for causing said first additional horizontal conductor to contact a particular one of said first set of vertical conductors when a bar in said first additional row of bars is moved in a first direction to the limit of its movement and to break the contact with said vertical conductor when said bar is moved in the other direction to the limit of its movement, and means for causing said second additional horizontal conductor to contact a particular one of said second set of vertical conductors when a bar in said second additional row of bars is moved in said first direction to the limit of its movement and to break the contact with said vertical conductor when said bar is moved to the limit of its movement in the other direction.

5. A coordinate switch, as defined in claim 4, in which the means for causing an additional horizontal conductor to make and break contact with a particular vertical conductor comprises a latch member having two positions of operation and mounted for movement in the direction of movement of the associated horizontal bar from one position to the other, means for retaining said member in each position of operation until moved to its other position, and a loose coupling between said associated horizontal bar and said latch member, said coupling having enough play to permit said bar to be moved to a midway rest position without moving said latch from one of the positions in which it has been placed.

References Cited in the file of this patent

UNITED STATES PATENTS

| Number | Name | Date |
|---|---|---|
| 2,338,997 | Busch | Jan. 11, 1944 |
| 2,524,774 | Deakin | Oct. 10, 1950 |